United States Patent [19]

Chen et al.

[11] 4,208,168

[45] Jun. 17, 1980

[54] WIND TURBINE

[76] Inventors: Jimmy M. Chen; Signor Y. Chen; Vincent S. Chen, all of No. 10, 3rd Fl., Alley 20, Lane 125, Chung 12th Rd.,, Shih Lin District, Taipei, Taiwan

[21] Appl. No.: 906,924

[22] Filed: May 18, 1978

[51] Int. Cl.² .............................................. F03D 3/06
[52] U.S. Cl. .............................. 416/132 B; 416/197 A
[58] Field of Search ......... 416/132 B, 240 A, DIG. 6, 416/197 A

[56] References Cited

U.S. PATENT DOCUMENTS

| | | | |
|---|---|---|---|
| 19,383 | 2/1858 | Shaw | 416/240 A |
| 215,035 | 5/1879 | Alden | 415/4 |
| 802,144 | 10/1905 | Harrington | 416/41 |
| 924,909 | 6/1909 | La Bauve | 416/DIG. 6 |
| 1,298,247 | 3/1919 | Muller | 415/2 |
| 3,743,848 | 7/1973 | Strickland | 416/DIG. 6 |
| 3,810,712 | 5/1974 | Hillman | 416/117 |
| 4,047,833 | 9/1977 | Decker | 415/2 |
| 4,118,637 | 10/1978 | Tackett | 416/196 A X |
| 4,134,708 | 1/1979 | Brauser | 415/2 X |

FOREIGN PATENT DOCUMENTS 396368  1/1933  United Kingdom .............. 416/DIG. 6

*Primary Examiner*—Everette A. Powell, Jr.
*Attorney, Agent, or Firm*—Shoemaker and Mattare, Ltd.

[57] ABSTRACT

The present invention is related to an improved wind turbine particularly with the provision of a strengthened network axle pivoted upon an elevated lattice steel tower; and a few upper and lower rotor arms horizontally fixed onto said strengthened network axle—respectively onto upper portion and lower portion thereof; and a few blades which, being V shaped in cross section, are provided between said upper and lower rotor arms; and a transmission mechanism; being thus constructed that wind power is liable to be converted into mechanical power therefrom.

12 Claims, 9 Drawing Figures

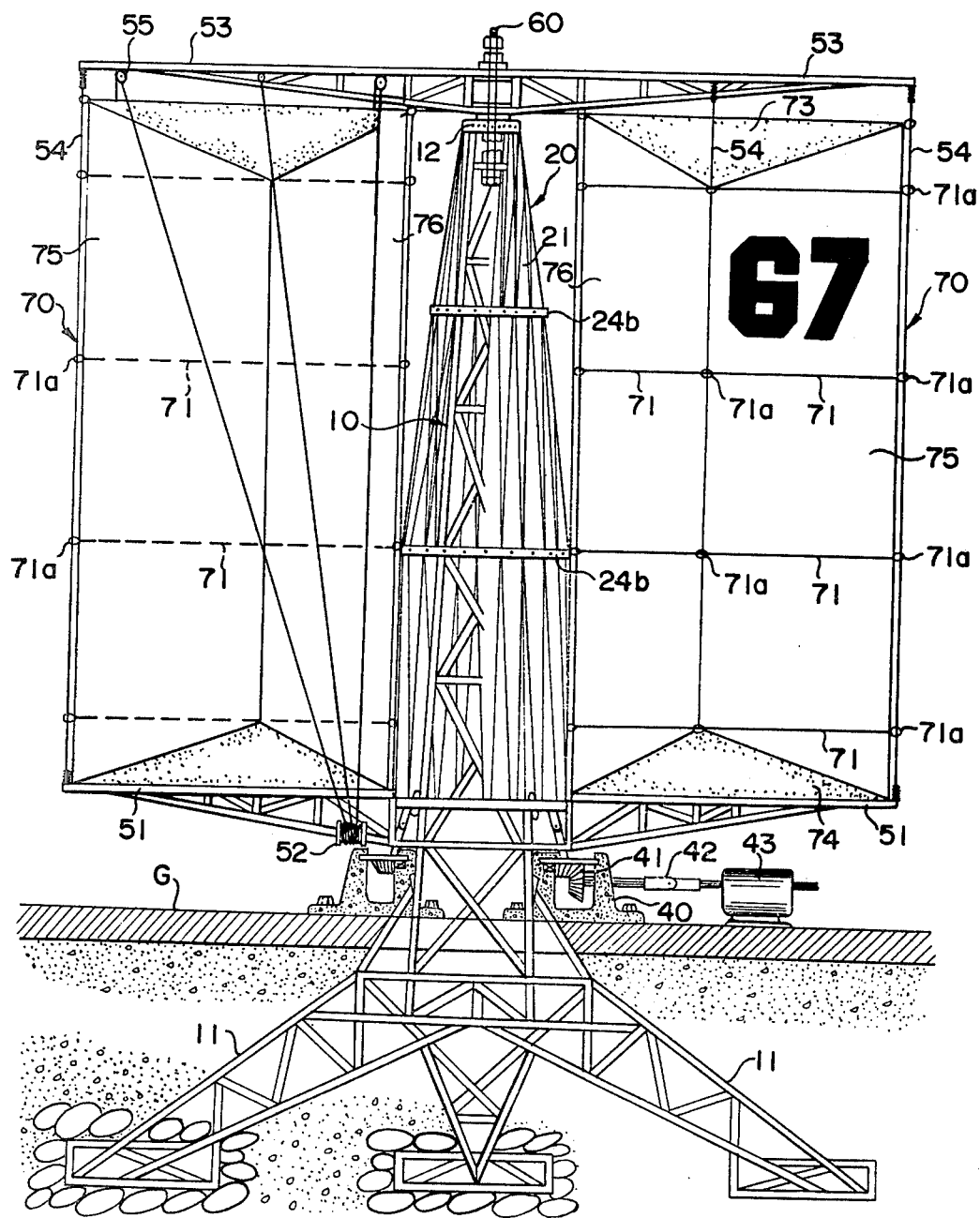

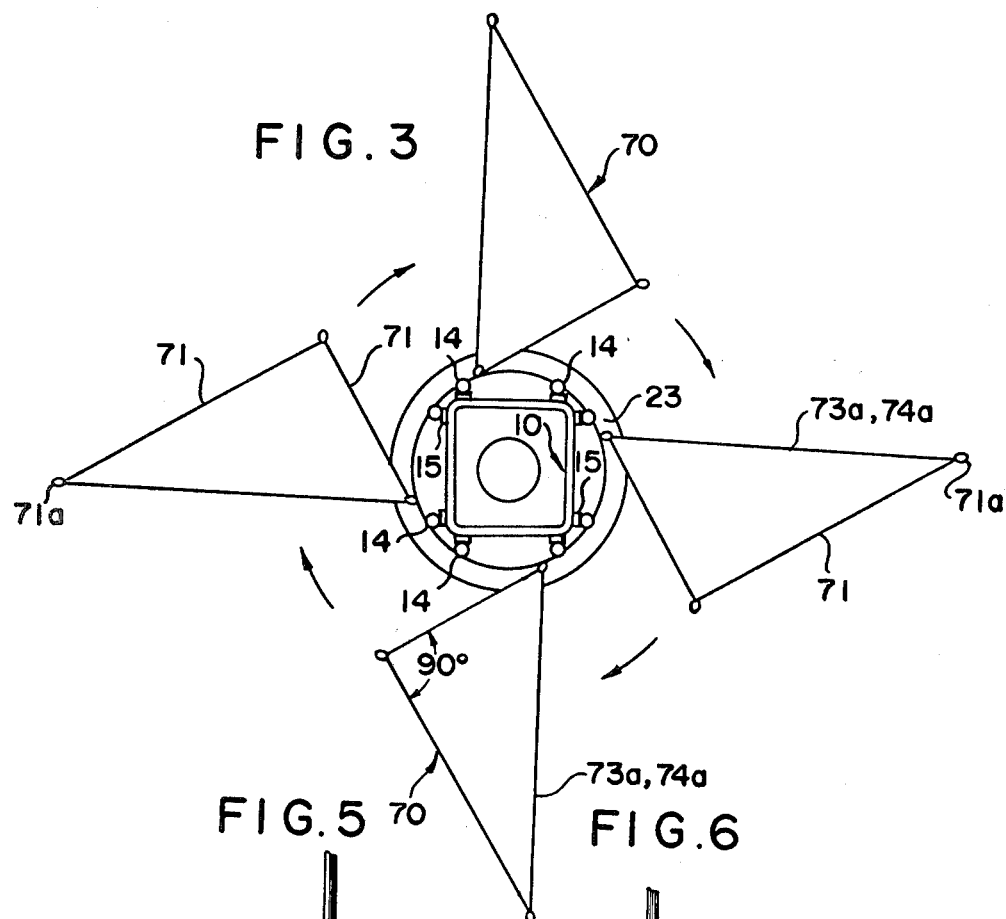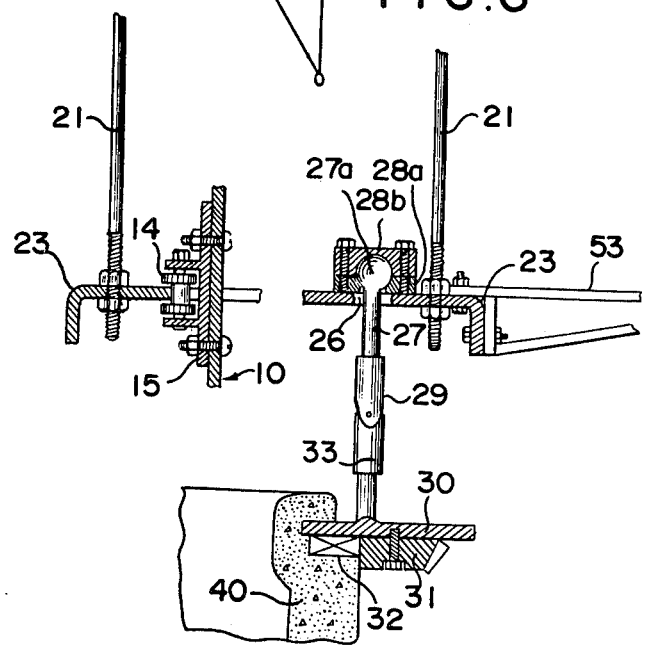

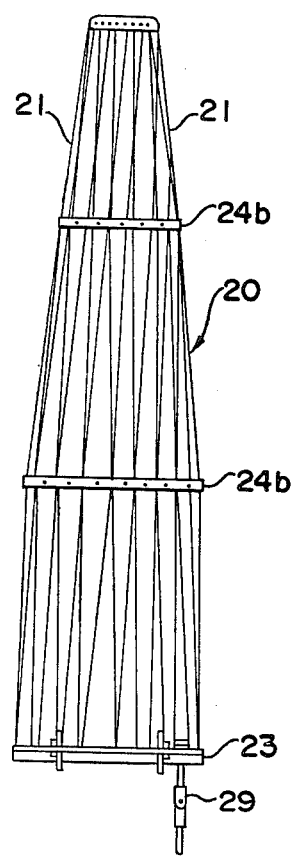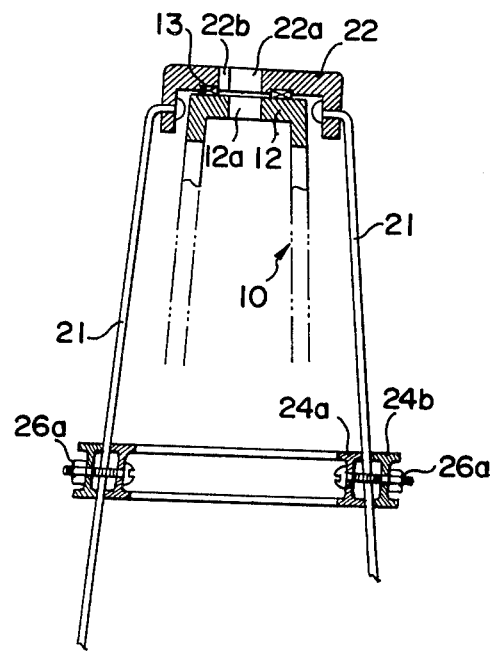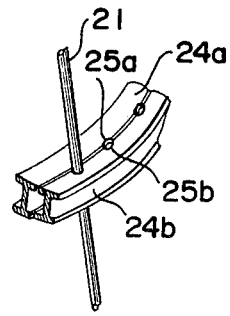

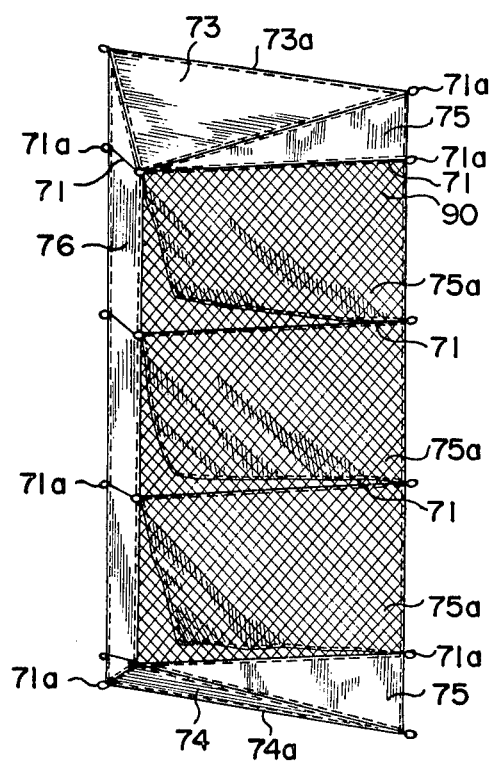

WIND TURBINE

BACKGROUND OF THE PRESENT INVENTION

There are four well-differentiated types of windmills, viz.:
1. The multi-bladed turbine wheel, or American type.
2. The Dutch type
3. The propeller type high-speed wheel.
4. The rotor.

According to any of the conventional windmills as listed hereinabove, the blades thereof are pivoted at the top of the tower.

And, the starting torque, and therefore the wind speed at which the wheel start, is largely determined by the blade angle. However, it is partly due to the inherently limited area of the blades to effectively be thrust by wind, and partly due to the uncertainty of operation, the conventional windmills equally generate small amount of energy. In addition, they also share the same drawback of possible interference with television reception.

It is an object of the present invention to provide an improved wind turbine whose center of gravity is low enough to attain a steady rotation thereof.

Another object of the present invention is to provide an improved wind turbine whose total area of blades is practicably large enough to make them more effectively thrust by wind.

Still another object of the present invention is to provide an improved wind turbine whose blades are liable to be ascended or descended.

Other objects, advantages, and meritorious features of the present invention will more fully appear from the following description, claims, and accompanying drawings, wherein:

FIG. 2 is a front view of a preferred embodiment of the present invention;

FIG. 3 is a top view of a preferred embodiment of the present invention;

Figure 1:
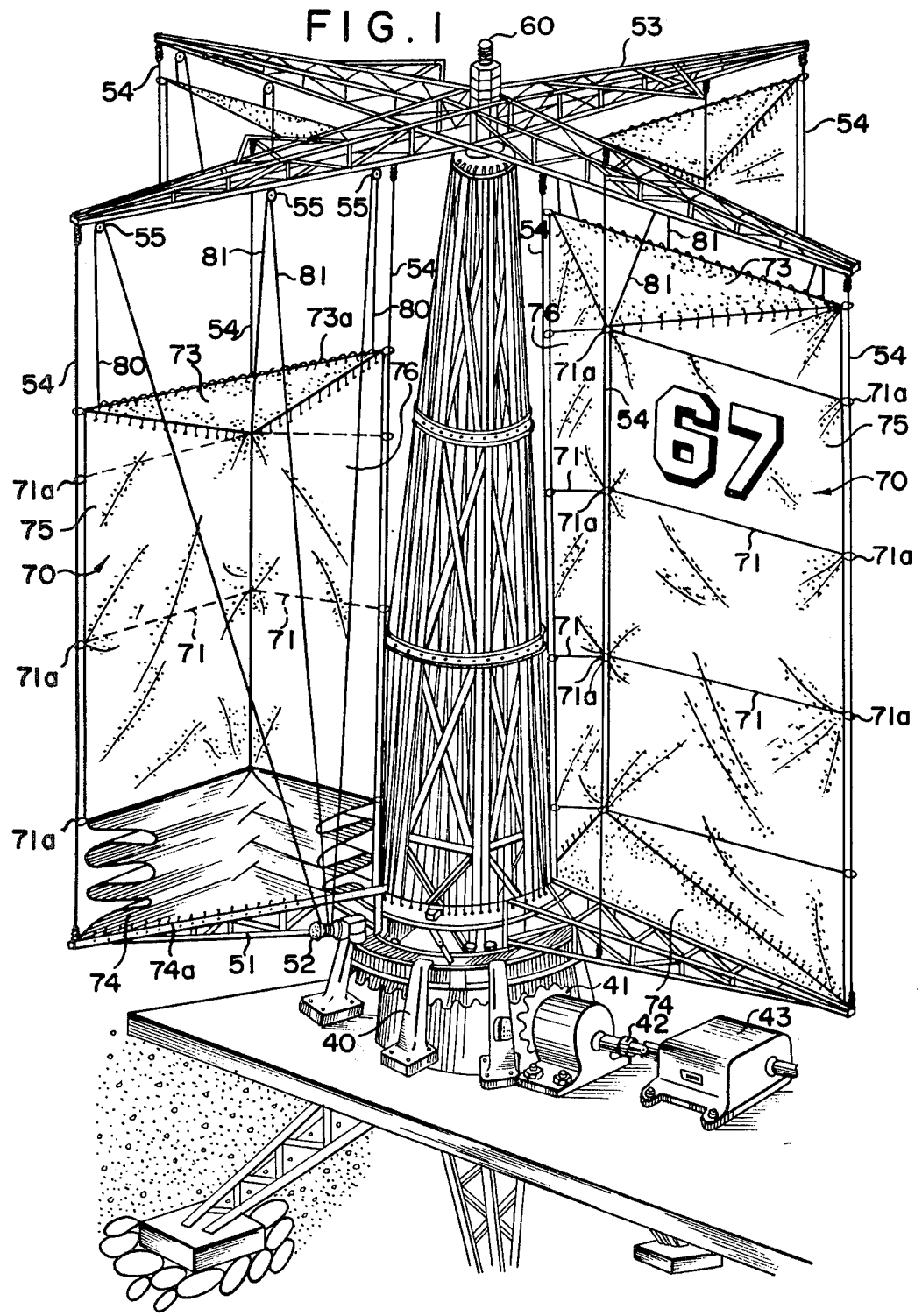
FIG. 1 is an oblique view of a preferred embodiment of the present invention.

FIGS. 4A, 4B and 4C schematically show the strengthened network axle of a preferred embodiment of the present invention, the former one being in completeness, the latter two being in part but also enlarged;

FIG. 5 is the enlarged fixed pulley of a preferred embodiment of the present invention to schematically show the relative position and movement to said strengthened network axle;

FIG. 6 is the enlarged universal coupling of a preferred embodiment of the present invention to schematically show its relation with said strengthened network axle; and FIG. 7 is a schema of another embodiment of an outer side sail.

As indicated in FIGS. 2 and 3, a bed plate G is provided upon the ground surface such that a lattice steel tower 10 being square in cross section is built thereupon and a tower base 11 is built thereunder. As indicated in FIGS. 4 and 5, disposed upon the top of said lattice steel tower 10 is a bearing base 12, whereas disposed upon the lower portion of same is a plurality of roller bases 15 whereupon there are pivoted with a plurality of cylindrical rollers 14 of I shape in vertical section, as indicated in FIGS. 4A and 4B a strengthened network axle 20, being conical, is formed by a plurality of matalic bars 21—21 of suitable diameter, those which are fixed respectively at a steel wheel 22 atop and at a bottom rim 23 provided at the lowest portion thereof, being oblique and intersected with each other. At the suitable portions of the axle body as seen in FIGS. 4B and 4C, there are provided at least a set of holding rings 24a and 24b, the former having the provision of grooves 25a, the latter having the provision of grooves 25b, said steel bars 21—21 extend respectively through between grooves 25a and 25b and are thereby fastened with the aid of bolts 26a—26a so that tensile and torsional stress occurred between said steel bars 21—21 are resisted. As shown in FIGS. 4B and 5, said strengthened network axle 20 is mounted around the periphery of said lattice steel tower 10 in a particular manner in that said steel wheel 22 is mounted upon said bearing base 12 while the inner circumference of said bottom rim 23 is held within the grooved rims of said cylindrical roller 14, so that said strengthened network axle 20 can rotate freely and smoothly with the aid of wind.

As shown in FIG. 6, a suitable number of steel rods 27—27, the uppermost portions of which are steel balls 27a—27a, are provided through a same suitable number of bores 26—26 which are provided at the optimum portions of said rim 23. Said steel ball 27a is installed within the space constituted by two split-type halves, the upper one being referred as 28a, the lower one being referred as 28b, both of which are clamped onto said rim 23 by virtue of bolts. Another rod 33 in connection with said rod 27 by virtue of an universal coupling 29 is fixed onto an annulus 30 onto which a bevel gear wheel 31 is bolted thereunder. A bearing 32 is installed at the inner circumference of the bottom portion of said annulus 30 whereby said rotary ring 30 and said bevel gear wheel can smoothly and freely rotate upon a fixed seat 40 which is installed upon said bed plate G. Furthermore, said bevel gear wheel 31 is in engagement with another bevel gear wheel 41 and meantime in this case another universal coupling is provided so that power can be further transmitted to a gear-change system 43.

As shown in FIGS. 1, 2, and 3 around the periphery of said rotary ring 23 there are provided more than three lower rotor arms 51—51. In the preferred embodiment of the present invention, said lower blade scales is four, any two of which are isogonal in a comparison with each other. Provided at the suitable sides of said lower rotor arms 51—51 are electric winches 52—52 so that the blades 70 can be lowered or lifted as desired.

As seen in FIGS. 1, 2, and 4B, a hole 22a is provided through the center of said steel wheel 22 and a hole 12a is provided through the center of said bearing, said two holes being in alignment with each other such that an axle 60 is provided therethrough. Furthermore said axle 60 has the provision of keys thereupon (not shown in accompanying drawings) to be in mesh with key ways 22b of said hole 22a so that said strengthened network axle 20 can be turned to move by upper rotor arms 53—53 which are fixed onto said axle 60 in the center thereof. Said lower rotor arms 51—51 are correspondingly as many as said upper blade scales 53—53.

Every two of said upper rotor arms 53—53 in abutment with each other intersect in right angle. And furthermore said upper rotor arms 53—53, being also preferably four in number, are arranged vertically in alignment with said lower rotor arms 51. At one suitable side of each said upper rotor arm 53 is provided a suitable number of pulleys 55, through the grooved rims of which cables are encircled further to said electric winch 52.

As shown in FIG. 2, there are provided steel cables 54—54 which are respectively installed between said upper rotor arms 53—53 and said lower rotor arms 51—51. A suitable number of cable rings 71a are provided at the angle portions of blades 70 to admit the insertion of said steel cables 54—54 therethrough along which said blades 70 can thereby slide upward or downward. Each blade 70, being V shaped in cross section, is formed by a trapezoidal outer side sail 75, a trapezoidal inner side sail 76, a triangular end sail 73 and a triangular base sail 74. In a preferred embodiment of the present invention, said inner side sail 76 which is more in abutment with said strengthened network axle than said side sail 75 is larger in size and the magnitude of the angle formed by said two side sails 75 and 76 is around 90°.

Said sails can also be made of the other suitable materials than sail. As seen in FIG. 1, a suitable number of supporting rods 71—71 are crossly provided between two vertical edges of each said side sails, at the ends of said supporting rods 71—71 said cable rings 71a—71a being installed. Also as seen in FIG. 1, two cables 80—80 are fixed at the longest edge of each end sail 73 while one cable 81 is fixed at the tip opposite to said longest edge thereof, said three cables further passing through said pulleys 55—55 and still further reaching said electric winch 52. The longest edge of each base sail 74 is fixed onto said lower blade scale 51.

Whether in a full or partial sail—partial in a particular case when comes the typhoon or hurricane, said blades 70—70 is liable to admit the entrance of wind. Due to the V shape in cross section, said blade 70—70 is facilitated rotate with less resistance such that the loss of wind is decreased to the least. Said blades 70—70 moved by wind impart a motion to said upper and lower rotor arms 51 and 53 and further to said strengthened network axle 20, and yet further, through said universal coupling, to said annulus 30 whereby said bevel gear wheel 31 actuates said bevel gear wheel 41, said gear wheel 41 imparting the motion still further to said gearchange system 43 out of which the wind power is finally converted to mechanical power available for practical use.

As shown in FIG. 7 which depicts another embodiment of outer side sail, between supporting rods 71—71, there are suspended rectangular sail pieces 75a—75a and behind said said pieces 75a—75a, there are provided a rectangular net. When receiving wind, said sail pieces 75a—75a can incorporate with another as if they were a large piece of sail. However when they only rotate around said network axle rather than bring about any work, the lower parts of said sail pieces 75a—75a will fly up so that the resistance will be greatly decreased.

The size of the present invention, in direct proportion to which is the magnitude of the mechanical power therefrom, can be choosed to meet any practical requirements. Furthermore, the present invention has no partial appetite for the direction of wind and besides, its center of gravity is low.

What we claim is:

1. An improved wind turbine with the provision of a lattice steel tower;
  a conical strengthened network axle which is mounted upon said lattice steel tower; and
  more than three upper rotor arms and more than three lower rotor arms, said upper and lower rotor arms being vertically in alignment with each other and horizontally fixed onto said strengthened network axle;
  a plurality of vertically oriented stays each operatively attached to an upper and a lower rotor arm;
  more than three blades which are adapted to be trimmed between said upper rotor arms and lower rotor arms, each of said blades including an inner side sail, an outer side sail, an end sail and a base sail, said outer side sail including a plurality of separate rectangular sail pieces with a rectangular net behind said rectangular sail pieces and attached to said vertical stays;
  a transmission mechanism, said transmission mechanism being connected to said axle so that thrust by wind, said blades will impart a motion to said strengthened network axle and to said transmission mechanism for converting wind power into mechanical power.

2. An improved turbine according to claim 1, wherein said inner side sail and outer side sail, being trapezoid but different from each other in trapezoid height constitute a suitable angle therebetween such that each said blade presents a cross section which tapers outwardly from the axle.

3. An improved wind turbine according to claim 1, wherein an electric winch is further disposed upon each said lower blade scale and meantime pulleys are further disposed upon each said upper rotor arms whereby cables, which are further fixed onto the edges of each said end sails, can pass through said pulley and then be rolled upon said electric winch.

4. An improved wind turbine according to claim 1, wherein said strengthened network axle is formed by a plurality of steel bars in a manner in that said steel bars are obliquely intersected with one another and are held fixed with the aid of a few holding rings.

5. An improved wind turbine according to claim 1, wherein a few rods with ball heads are provided at the bottom rim of said strengthened network axle—each with one end thereto, while the other end of each said rods are connected on to an universal coupling which connects an annulus, said annulus being provided a gear wheel thereunder out of which a mechanical power converted from wind is transmitted.

6. An improved wind turbine according to claim 1 wherein the inner circumferential edge of said bottom rim of said strengthened network axle is in mesh with the grooved rims of a plurality of cylindrical rollers which, being I shape in a view of vertical section, are pivotedly provided upon the roller bases, said roller bases being provided around the lower portion of said lattice steel tower.

7. A wind turbine comprising:
  a turbine base;
  a steel tower having a top and a bottom and being mounted at said tower bottom on said turbine base, said steel tower being formed of a plurality of bars which are spaced apart;
  a network axle rotatably mounted on said steel tower, said network axle being conically shaped with an axle base located near said turbine base and an apex located remotely from said axle base so that the center of gravity of said network axle is nearer said axle base than to said axle apex, said axle apex being supported on said tower top so that said axle hangs down from said tower top, said axle and said tower being concentric with said axle surrounding said tower and extending for essentially the entire length of said tower, said axle including a plurality of braces which are spaced apart to lower wind resistance of said axle and being supported adjacent said tower base;

a plurality of upper rotor arms and a plurality of lower rotor arms, said rotor arms being fixed to said network axle and horizontally disposed, said rotor arms each being outwardly tapered in cross section from said network axle;

a plurality of blades movably mounted on said rotor arms so that said blades can be trimmed according to weather conditions, each of said blades including a plurality of sails; and a transmission mechanism, said transmission mechanism being connected to said axle so that thrust by wind, said blades will impart a motion to said strengthened network axle and to said transmission mechanism for converting wind power into mechanical power.

8. The wind turbine defined in claim 7 wherein said plurality of sails includes an inner sail, an outer side sail, an end sail and a base sail, said outer sail including a plurality of separate rectangular sail pieces.

9. The wind turbine defined in claim 8 further including a plurality of vertically oriented stays each operatively attached to an upper and a lower rotor arm and a rectangular net located behind said rectangular sail pieces and attached to said vertical stays.

10. The wind turbine defined in claim 9 wherein said plurality of rotor arms include more than three upper rotor arms and more than three lower rotor arms.

11. The wind turbine defined in claim 1 wherein said separate rectangular sail pieces are attached only at the tops thereof and are free to swing outwardly away from said net.

12. The wind turbine defined in claim 10 wherein said separete rectangular sail pieces are attached only at the tops thereof and are free to swing outwardly away from said net.

* * * * *